No. 884,651. PATENTED APR. 14, 1908.
J. H. FREY.
LAWN MOWER.
APPLICATION FILED JAN. 10, 1907.
2 SHEETS—SHEET 2.
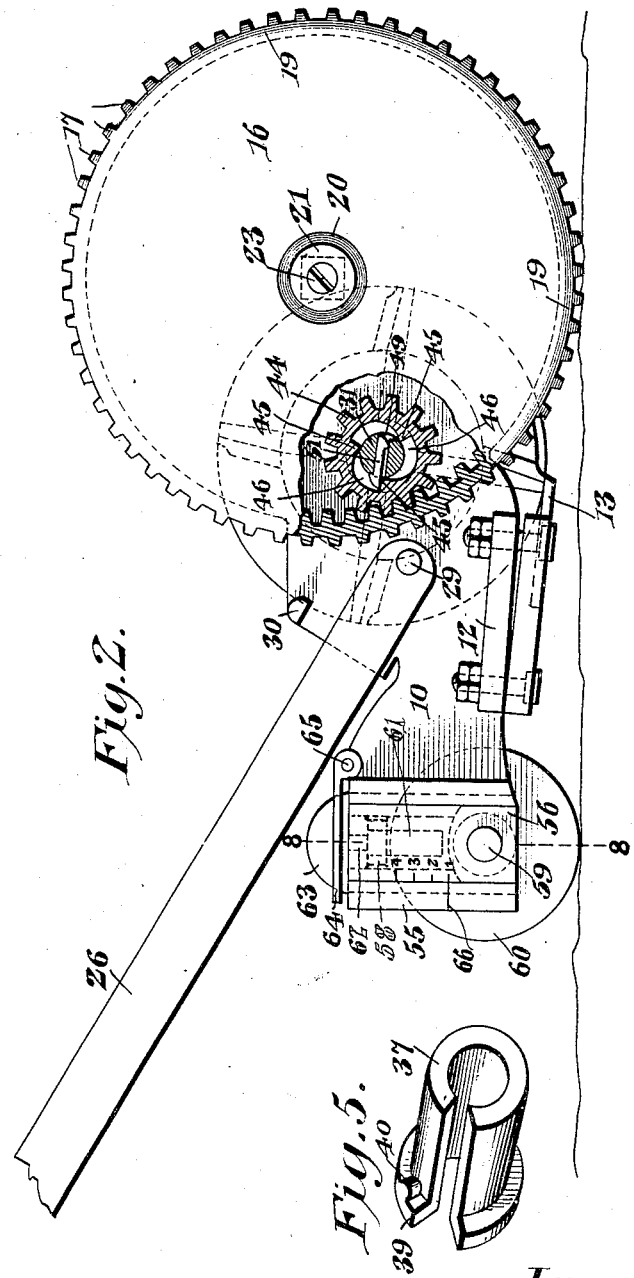
Witnesses
Jas. K. McCathran
B. G. Frete
James H. Frey, Inventor
By E. G. Siggers
Attorney

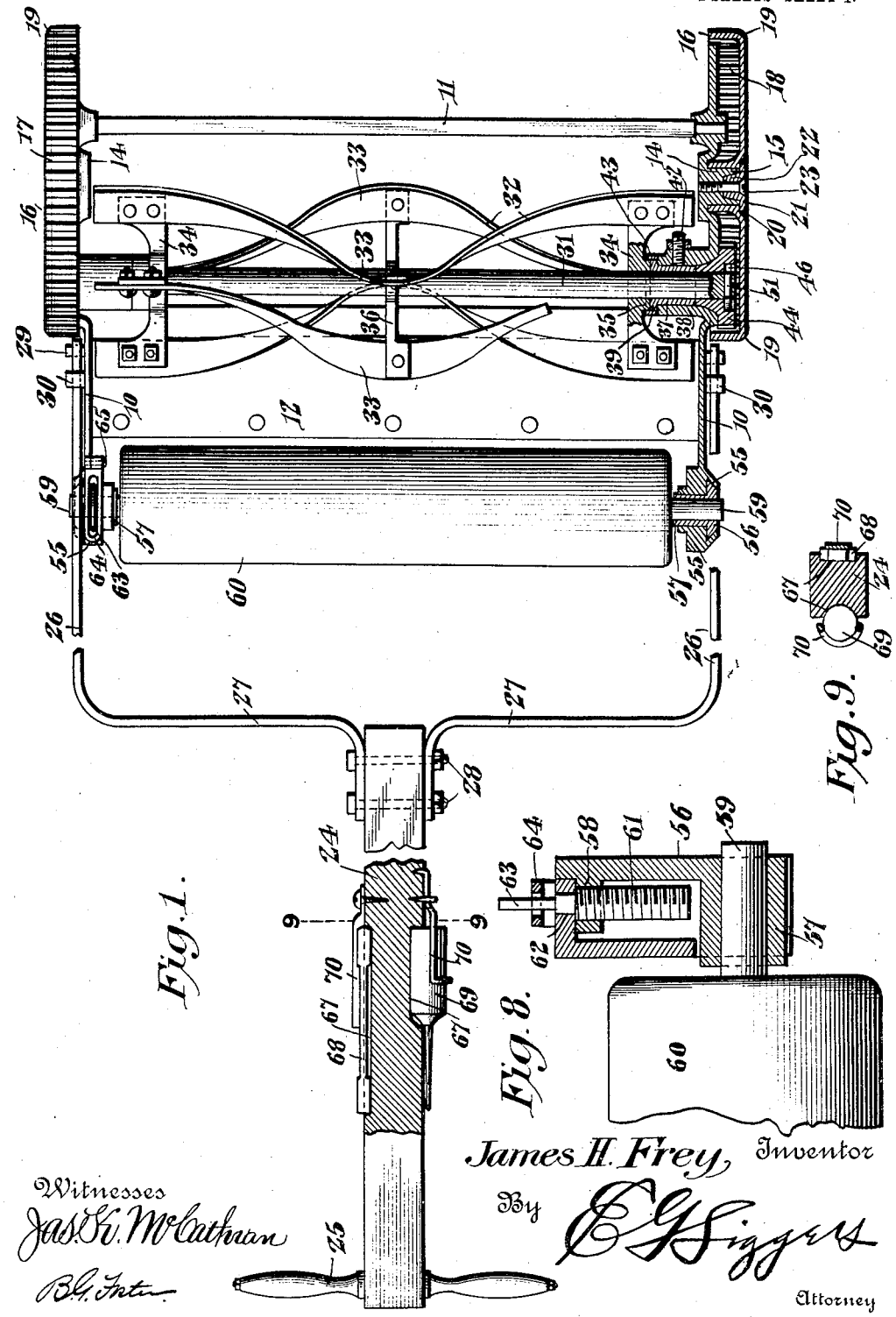

UNITED STATES PATENT OFFICE.

JAMES HENRY FREY, OF VINCENNES, INDIANA, ASSIGNOR OF ONE-HALF TO FRANK C. HARDACRE, OF VINCENNES, INDIANA.

LAWN-MOWER.

No. 884,651.  Specification of Letters Patent.  Patented April 14, 1908.

Application filed January 10, 1907. Serial No. 351,659.

*To all whom it may concern:*

Be it known that I, JAMES HENRY FREY, a citizen of the United States, residing at Vincennes, in the county of Knox and State of Indiana, have invented a new and useful Lawn-Mower, of which the following is a specification.

This invention relates more particularly to manually propelled grass clippers or lawn mowers.

It is a well known fact that the ordinary mower had broad driving wheels with the journal spindles or fasteners for the wheels projecting beyond their outer faces, and the handles connected to the inner sides of the frame members and above the axis of rotation of the driving wheels. The result is that the ends of the cutter blades have to be spaced some distance from the inner sides of the frame members in order to escape the handles, a comparatively great amount of uncut grass is left between the ends of the blades and the outer sides of the wheels, and this grass is laid prostrate so that it cannot be properly cut on the succeeding swath, the machine cannot be operated to cut closely around trees and like obstructions, and in high grass, the power being applied so high, tends to tilt the mower and carries it over the grass without cutting it.

The principal object of the present invention is to produce a mower, wherein the uncut track passed over by the mower is very narrow, the structure being such that it can be operated in close proximity to a tree or like obstruction without injuring the machine or the obstruction, and furthermore to apply the power so that tilting will be entirely avoided.

Other objects are to provide, novel, simple and effective driving mechanism, which is capable of preventing the wrapping of the grass around the journal cutter, and to provide novel and effective means for gaging the cut of the machine.

The preferred embodiment of the invention is illustrated in the accompanying drawings, wherein:—

Figure 1 is a plan view of the machine, portions thereof being shown in section. Fig. 2 is a side elevation of the same, with a part of the driving wheel and associated pinion illustrated in section. Fig. 3 is a plan view on an enlarged scale of one of the journal bearings for the cutter shaft. Fig. 4 is a sectional view on the line 4—4 of Fig. 3. Fig. 5 is a detail perspective view of the journal bushing. Fig. 6 is a sectional view on the line 6—6 of Fig. 3. Fig. 7 is a detail sectional view on an enlarged scale of the clutch connection between the pinion and cutter shaft. Fig. 8 is a detail sectional view on the line 8—8 of Fig. 2. Fig. 9 is a detail sectional view on the line 9—9 of Fig. 1.

Similar reference numerals designate corresponding parts in all the figures of the drawings.

In the embodiment illustrated, a frame is employed, comprising side members 10 connected at their front ends by a tie rod 11, and at their rear ends by a plate 12, on which is adjustably mounted in any desired manner, the ledger blade 13 of the cutting mechanism. Each side member is provided with an outstanding stud 14 having an angular and tapered socket 15 in its outer end, and journaled on each stud is a driving wheel 16. These driving wheels are narrow, as shown in Fig. 1, and have peripheral teeth 17. They are also provided with internal gear teeth 18. It will be observed, particularly by reference to Figs. 1, 2 and 3 that the outer corners of the wheels are rounded or beveled off, as shown at 19, and that the teeth 17 terminate short of the outer faces of the wheels. Said wheels also have central recesses 20, in which are located washers 21, the outer faces of which are flush with the outer faces of the wheels. The washers are provided with tapered and angular projections 22 that fit in the sockets 15, and said washers are held in place by holding screws 23 that pass through the projection and are screwed into the inner ends of the studs 14. It will thus be seen that the wheels extend but a comparatively slight distance outside the side members of the frame, that their corners are rounded and that the fastening means for said wheels do not project beyond the outer faces thereof.

The means for propelling the machine consists of a handle including a bar 24 having a cross arm 25 at one end, forming handle grips. Secured to the other end of this bar is a bail including side arms 26 that are disposed in parallel relation, and have inwardly extending alined portions 27, bolted as shown at 28 to the bar 24. The side arms 26 have their lower ends pivotally connected as shown at 29 to the outer sides of the side frame members 10 and the pivotal connections are disposed in rear of the wheels 16 and below their axis of rotation, as clearly illustrated in Fig. 2. The upward swinging movement of the handle is limited by outstanding lugs 30 carried by the frame members 10, and located over the side arms 26.

Coöperating with the ledger blade 13 is a rotatable cutter comprising a shaft 31, around which are placed cutting blades 32. These cutting blades are disposed in spaced relation to the shaft, and each has its central portion curved or bowed rearwardly with respect to its direction of movement, as shown at 33. The ends of the blades operate in close proximity to the inner sides of the frame members 10, and are secured to the shaft by spider brackets 34 having hub portions 35. The central or bowed portions 33 are also secured to the shaft by a similar spider bracket 36. The ends of the shaft are journaled in split bushings 37 that are located in inwardly extending bosses 38 formed upon the frame members 10, these bushings having flanges 39 at their inner ends and of the same diameter as the hubs 35 of the end spider brackets 34. The bushings furthermore are provided with lugs 40 that are engaged in notches 41 formed in the inner ends of the bosses 38, as illustrated in Fig. 3, such lugs thus preventing the rotation of the bushings. In order to take up the wear between the shaft and bushing, a set screw 42 is threaded through each boss 38, and bears against the bushing located therein, as will be clear by reference to Fig. 1. The joints between the hubs 35 of the end spider brackets 34 and the flanges 39 of the bushings, are covered by guard sleeves 43 that surround the same, and are interposed between the spider brackets and the bosses. These guard sleeves eliminate to a very material degree the danger of grass and like material becoming wrapped around the journal bearings.

The ends of the shaft 31 project within the driving wheels 16, and journaled thereon are pinions 44, the teeth of which mesh with the internal gear teeth 18 of said driving wheels. By reference to Figs. 2 and 7, it will be noted that these pinions have inwardly extending lugs 45 forming seats 46 between them. Each lug is formed on one side with a sharp abutment portion 47, while its other side has a curved portion 48. Each end of the shaft is furthermore provided with a transverse socket 49 extending therethrough, and located within the pinions. The portions of the shaft on diagonally opposite sides of the sockets 49 are cut away to form seats 50. A dog 51 is mounted in each socket, and has a longitudinal and a lateral movement therein. Each dog is provided with oppositely disposed terminal hooks 52, one side of each hook having a sharp abutment portion 53 that is arranged to coact with the abutment portions 47 of the lugs 45, while their opposite sides are provided with curved portions 54 that coact with the curved portions 48 of the lugs 45. Each dog is of such a length that when one end is located in the socket of the shaft, the other end will be in projecting relation thereto, and the hook will engage over and rest against the adjacent seat 50. The projecting hook is thus located in one of the seats 46 of the pinion, and in a position to be struck by either the sharp abutment portion 47 or the curved portion 48 accordingly as the pinion revolves in one direction or the other. It will thus be evident that with this construction, if the mower is propelled forwardly, one of the abutment portions 47 will strike the abutment portion 53 of the projecting hook, thus carrying the bill of said hook into the cutaway seat 50, and locking the pinion and shaft together, so that said shaft, and consequently the cutter will be revolved. On the other hand, if the machine is drawn rearwardly, the curved portion 48 will strike the curved portion 54 of the dog, and first swing the same rearwardly with respect to the direction of movement of the shaft, after which said hook will be forced into the socket 49, while the opposite hook will be projected, but immediately the curved portion of said other hook will be struck by one of the curved portions 48 of the pinion, and the dog will be returned. Consequently, the pinion will be unclutched from the shaft, and will rotate independently thereof.

The rear ends of the frame members 10 are provided in their outer sides with upright dovetailed guide-ways 55, and in the same are slidably mounted carriages comprising plates 56 having inwardly extending journal boxes 57 at their lower ends, and inwardly extending ears 58 at their upper ends. In the boxes are journaled the gudgeons 59 of a gage roller 60. An adjusting screw 61 is threaded into each ear 58, and is journaled as shown at 62 in the upper portion of the corresponding frame member 10. The upper end of this screw has an actuating thumb piece 63, over which engages a clip 64 that normally prevents the turning of this screw, said clip being hinged, as illustrated at 65 to the frame member. Each plate 56 is provided with a scale, as shown in Fig. 2, and each frame member has an indicating mark 66 thereon. To gage the cut of the machine therefore, it is only necessary to swing the holding clips 54 out of engagement with the thumb-pieces 63, and rotate the screws, whereupon the carriages will be removed so as to raise or lower the rear ends of the pieces 10 until the desired height of the ledger blade above the surface of the ground is obtained. The scales are important, in order to obtain a like adjustment for both ends of the gage roller.

For the purpose of conveniently carrying the necessary implements of the machine, the handle bar 24 is provided in its opposite sides with recessed seats 67, which respectively receive a wrench 68 and an oil can 69. These are held in place by suitable spring clips 70 that extend over the seats so that they will engage the implements and maintain them in place, while permitting of their ready detachment when needed.

It will be evident that a machine when thus constructed, is compact and serviceable. The operating mechanism and bearings for the rotary cutter are incomplex, reliable, and durable. The means for adjusting the gage roller is also simple, and is believed to be an important feature of the machine. Particular attention, however, is invited to the arrangement of the driving wheels, the handle connection, and the relation of the rotary cutter thereto. As already noted, the driving wheels are very narrow. Their outer margins are beveled or rounded, and the fastening means do not project beyond their outer faces. As a consequence, the machine can be operated close to trees or other obstructions, and will not injure the same. Moreover, the handles being connected outside the frame members, and in rear of the wheels, are not in the way of the cutter, and the ends of the cutting blades can be placed in close proximity to the frame members and wheels so that very narrow tracks of uncut grass are passed over by the machine. Moreover the connections of the handle below and in rear of the axis of rotation of the driving wheels prevent the machine being tilted upwardly when meeting with resistance in long or tough grass.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a lawn mower, the combination with a frame having spaced side members, of wheels journaled on the outer sides of the side members, a handle having a pivotal connection with the outer sides of the side members in rear of the wheels and below their axis of rotation, and a revoluble cutter driven by the wheels and having its ends operating directly adjacent to the inner sides of said side members.

2. In a lawn mower, the combination with a frame having spaced side members, of narrow peripherally toothed driving wheels journaled on the outer sides of the side members, said wheels having their outer corners rounded and having peripheral teeth terminating short of the outer faces of said wheels, a handle including a bail having parallel side arms hinged at their lower ends to the outer sides of the frame members in rear of the wheels and below their axis of rotation, and a revoluble cutter located between the side members and driven by the wheels, said cutter having its ends operating directly adjacent to the inner sides of the side members.

3. In a lawn mower, the combination with a frame having a boss and a notch in the inner end of said boss, of a driving wheel journaled on the frame, a split bushing located in the boss and having a flange at its inner end, said flange having a lug engaged in the notch of the boss, a set screw threaded through the boss and engaging the bushing, a rotatable cutter having a shaft journaled in the bushing and a hub that operates alongside the flange, and means mounted on the shaft outside the bushing and driven by the wheel for rotating the shaft.

4. In a lawn mower, the combination with a frame, of a driving wheel journaled on the frame, a shaft journaled in the frame, rotary cutter blades, means connecting the blades to the shaft, and a guard sleeve surrounding the shaft and being interposed between said blade connecting means and the inner side of the frame, and extending across the space therebetween to prevent grass wrapping about the shaft, said sleeve being free from the shaft.

5. In a lawn mower, the combination with a frame having an inwardly extending boss, of a driving wheel journaled on the outer side of the frame, a bushing located in the boss and held against rotation, said bushing having a flange located at the inner end of the boss, a rotary cutter including a shaft journaled in the bushing, cutter blades surrounding the shaft, and a spider bracket securing the blades to the shaft and having a boss directly associated with the flange of the bushing, driving means connecting the driving wheel and the shaft, and a guard sleeve interposed between the boss, and spider bracket and surrounding the hub of said bracket and the flange of the bushing.

6. In a lawn mower, the combination with a frame having an upright substantially dovetailed guide-way, of cutting mechanism journaled in the frame, a substantially dovetailed plate slidably mounted in the guide-way, said plate having a journal box and an offset ear spaced from the journal box, a screw journaled in the frame and having a threaded engagement with the ear of the plate, said screw having an actuating head, a holding clip hinged to the frame and engaging over the head to prevent the rotation of the screw, and a gage roller rotatably mounted in the journal box of the plate.

7. In a lawn mower, the combination with a frame having a boss, of an adjustable bushing located in the boss and projecting beyond the inner end thereof, a driving shaft journaled in the bushing, a driving wheel journaled on the frame and having a gear connection with the shaft, cutter blades, a spider securing the blades to the shaft and having a hub adjacent to the inner projecting end of the bushing, and a guard sleeve loosely surrounding the hub and projecting end of said bushing.

In testimony, that I claim the foregoing as my own, I have hereto affixed my signature in the presence of two witnesses.

JAMES HENRY FREY.

Witnesses:
EMILY J. KEITH,
JAMES M. ALTON.